United States Patent
Nakata et al.

[11] Patent Number: 5,999,502
[45] Date of Patent: Dec. 7, 1999

[54] OPTICAL INFORMATION RECORDING/ REPRODUCING APPARATUS HAVING FOCUS SERVO CONTROL COMPENSATION FOR LANDS AND GROOVES

[75] Inventors: Yasuo Nakata, Takaichi-gun; Nobuo Ogata, Shiki-gun; Kunio Kojima, Nabari; Hideaki Sato, Yamatokoriyama, all of Japan

[73] Assignee: Sharp Kabushiki Kaisha, Osaka, Japan

[21] Appl. No.: 08/539,523

[22] Filed: Oct. 6, 1995

[30] Foreign Application Priority Data

Dec. 22, 1994 [JP] Japan .................................. 6-320890

[51] Int. Cl.⁶ .................................................. G11B 7/095
[52] U.S. Cl. ...................... 369/44.26; 369/44.36; 369/44.29; 369/44.35; 369/44.27
[58] Field of Search ............................ 369/44.36, 44.26, 369/44.29, 43, 44.11, 44.35, 44.27, 54, 58; 250/201.5

[56] References Cited

U.S. PATENT DOCUMENTS

| | | | |
|---|---|---|---|
| 4,475,182 | 10/1984 | Hosaka | 250/201.5 |
| 4,823,330 | 4/1989 | Arter | 250/201.5 |
| 5,109,367 | 4/1992 | Yoshikawa | 369/54 |
| 5,138,594 | 8/1992 | Fennema | 369/44 |
| 5,297,114 | 3/1994 | Itoh | 369/44 |
| 5,475,664 | 12/1995 | Shimizume | 369/54 |
| 5,493,552 | 2/1996 | Kobori | 369/44.26 |
| 5,568,461 | 10/1996 | Nishiuchi | 369/44 |

FOREIGN PATENT DOCUMENTS

| | | |
|---|---|---|
| 27610 | 5/1992 | Japan . |
| 5-81717 | 2/1993 | Japan . |
| 5-73930 | 3/1993 | Japan . |
| 5-68774 | 9/1993 | Japan . |

Primary Examiner—W. R. Young
Assistant Examiner—Alan Faber
Attorney, Agent, or Firm—Nixon & Vanderhye P.C.

[57] ABSTRACT

In an optical information recording-reproduction apparatus, a focus servo control circuit generates a focus error signal and a light beam is accurately converged on a surface of an optical disk according to a focus servo control signal based upon the focus error signal. In accordance with the present invention, the focus error signal is compensated by selecting a land section focus offset amount by a switch when land sections are tracked, and it is compensated by selecting a groove section focus offset amount when groove sections are tracked. As a result, since the land sections and the groove sections are controlled by different focus servo control signals, recording and reproducing operations are carried out at the most optimal focusing positions respectively obtainable, thereby making it possible to significantly improve the quality of a reproduced signal.

4 Claims, 6 Drawing Sheets

OPTICAL INFORMATION RECORDING/ REPRODUCING APPARATUS HAVING FOCUS SERVO CONTROL COMPENSATION FOR LANDS AND GROOVES

FIELD OF THE INVENTION

The present invention relates to optical recording media and to an optical information recording-reproduction apparatus that uses a laser beam for recording and reproducing information on and from both a "land" section and a "groove" section, which together compose a "track" of the optical recording medium.

BACKGROUND OF THE INVENTION

As an optical information recording-reproduction apparatus records or reproduces information to or from a track on an optical disk, the apparatus performs tracking operations wherein a spot of light, produced by converging a laser beam emitted from a semiconductor laser by means of an objective lens, is irradiated to the track.

Conventionally, a light beam guiding track of the optical disk is composed of "groove" sections and sections between grooves (hereinafter, referred to as "land" sections).

In a conventional optical information recording-reproduction apparatus arrangement, where if an attempt is made to record information on both land sections and groove sections of an optical disk, whether information recorded on the land sections is reproduced, leakage of the information recorded on the adjacent groove sections (i.e., "crosstalk") increases. Likewise, when information recorded on the groove sections is reproduced, crosstalk from information recorded on the adjacent land sections increases. This adversely effects the quality of the reproduced signal. For this reason, information was conventionally only recorded on or only reproduced from either the land sections or the groove sections of optical disk media. Therefore, in the above-mentioned conventional optical information recording-reproduction apparatus, it was necessary to perform focusing and tracking on only one section of a track, i.e., either the land sections or the groove sections.

However, this arrangement imposed a serious limitation on the amount and density of information which could be stored on optical disk media, present, various alternative methods have been proposed to comply with demands for an optical disk having higher recording density to capabilities. One such method is disclosed in Japanese Unexamined Patent Publication No. 5-81717/1993 (Tokukaihei 5-81717), in which a magneto-optical disk (i.e., one utilizing magneto-optical effects) is utilized for storing and reproducing information at greater densities than that capable of being read using other conventional optical techniques. The proposed method makes use of what is known as magnetic super resolution properties. Using these properties crosstalk between adjacent tracks can be decreased by using "masking information", which is recorded on a magnetic layer formed on a perpendicular magnetization film, and thereby allowing a higher density of stored information.

In another approach, an apparatus which records or reproduces information on or from both the land sections and groove sections by switching the polarity of a tracking servo circuit is disclosed in Japanese Examined Patent Publication No. 4-27610/1992 (Tokukohei 4-27610).

The methods and apparatus disclosed in the above Publications decrease crosstalk between adjoining tracks even when information is recorded on or reproduced from both the land sections and the groove sections. As a result, since information can be recorded on or reproduced from both the land sections and the groove sections, at least twice the conventional amount of information can be recorded and recording with high information density becomes possible.

Figures 6A, 6B:
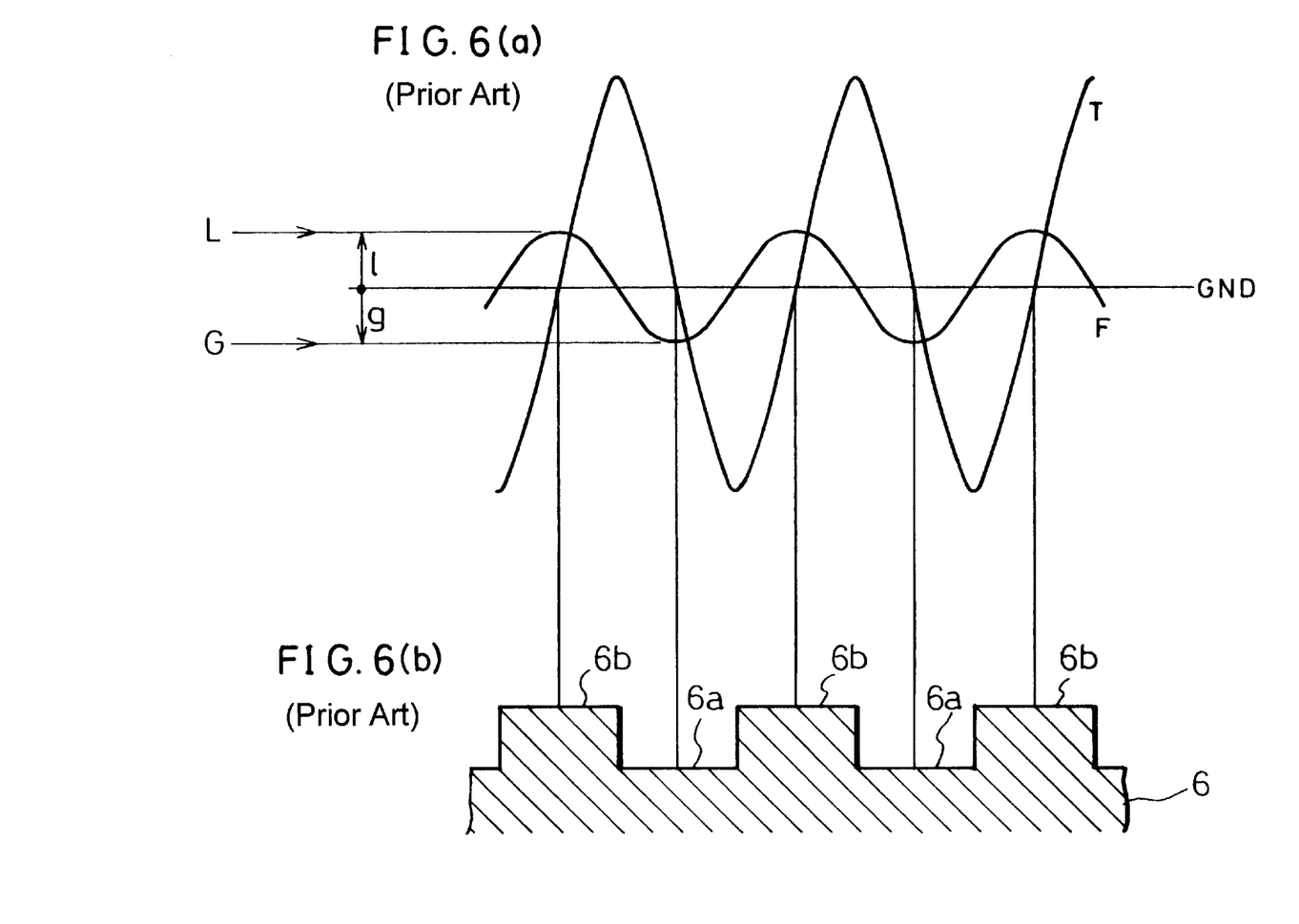
FIGS. 6(a) and 6(b) are illustrations of land sections and groove sections of an optical disk and a corresponding graph of focus and tracking error signal amplitudes illustrating the difference in signed amplitudes between focusing points in a land section and a groove section.

In a conventional optical information recording-reproduction apparatus, since focusing is performed on only either the land sections or the groove sections, the apparatus can perform suitable recording or reproduction using an independent focus servo control signal. However, in an optical information recording-reproduction apparatus for recording and reproducing information on or from both the groove sections and the land sections that uses the same focus servo control signal for recording/reproducing signals for both the land sections and the groove sections, it is not possible to achieve a satisfactory recording or reproduction. With reference to FIGS. 6(a) and 6(b), the following reasons describe why the most suitable focus servo control signal is different for the tracking of land sections and the tracking of groove sections.

On an optical disk 6, groove sections 6a and land sections 6b, which are depicted as convex sections between groove sections 6a, are formed on a disk substrate. The waveforms shown in FIG. 6(a) represent a focus error signal, F, and a tracking error signal, T, which are servo error signals obtained from an optical pickup when only a single focus servo is actuated. With respect to focus error signal F, upward peaks of the depicted waveform are formed when a spot of a semiconductor laser beam converged on optical disk 6 by an objective lens comes to land sections 6b. Likewise, when the spot of the semiconductor laser beam comes to groove sections 6a, the bottom peaks of the depicted waveform are formed. Focus error signal F is usually affected by a track of the optical disk 6 and it has a period same as that of the tracking error signal T shown in FIG. 6(a). Moreover, the focus error signal F has 90 degrees phase difference from the tracking error signal T and is modulated. Such a change in the focus error signal F is referred to as crosstalk between error signals in the present invention.

A reason that the crosstalk between error signals shown by waveforms in FIG. 6(a) is disclosed in Japanese Examined Patent Publication No. 5-68774/1993 (Tokukohei 5-68774). The crosstalk between error signals occurs because in the photo detector apparatus, which generates a servo error signal, light reflected from the optical disk is affected with aberrations due to the optical components of the optical pickup and, in particular, to the objective lens. Consequently, an asymmetrical property is attributed to the reflected light and, thus, the tracking error signal leaks into the focus error signal. Due to this crosstalk, the focus error signal F acquires a periodic form same as tracking error signal T, but its phase is delayed by 90 degrees due to the asymmetric properties of the light reflected from the optical disk.

As is clear from FIGS. 6(a) and 6(b) in the case where the tracking servo is turned ON after the focus servo, when the land section 6b is tracked by the spot of the semiconductor laser beam, its focusing point is on line L and when the groove section 6a is tracked, its focusing point is on line G due to the crosstalk between error signals F and T.

Since the focusing point at the time of tracking the land section 6b is different from that at the time of tracking the groove section 6a, whenever focus servo control is implemented using a the focus servo control signal generated according to the sole focus error signal F for both land section 6b and groove section 6a, deviation in the optical axis direction between. the objective lens and the optical disk 6 (i.e., focus offset) occurs. As a result, shapes of the converged light spot on the optical disk 6 become different, such that information respectively recorded on land section 6b and groove section 6a cannot be satisfactorily recorded or reproduced. Referring to FIGS. 6(a) and 6(b), it is evident that if the deviation between GND and line L for the land section focus offset is amount "1" and the deviation between GND and the line G for the groove section focus offset is amount "g", then the total deviation amount of the focusing point between the tracking of the land section 6b and the tracking of the groove section 6a is represented by 1+g.

A method for controlling crosstalk between the error signals by adjusting rotation of the objective lens about its optical axis is disclosed in Japanese Examined Patent Publication No. 5-68774/1993 (Tokukohei 5-68774). However, using that method requires a lot of time to adjust the objective lens. Moreover, since there exists not only the aberration of the objective lens but also aberration of other optical parts, the crosstalk between error signals cannot be completely eliminated by that method. Consequently, deviation of the focusing point along the optical axis between tracking land sections and tracking groove sections cannot be completely eliminated, thereby making it impossible to achieve optimum recording and reproducing when using that prior art method in controlling crosstalk.

SUMMARY OF THE INVENTION

It is a first object of the present invention to provide an optical information recording-reproduction apparatus that is capable of recording or reproducing a signal with improved quality by optimizing focus servo control signals respectively when the land sections and when the groove sections are tracked.

In order to achieve this first object, an optical information recording-reproduction apparatus of the present invention includes a light source for emitting a light beam, photo detecting means for detecting reflected light, which is obtained by reflecting the light beam from a surface of the optical recording medium, a focus servo control means for generating a focus servo control signal, which is determined by a focus error signal, in response to an electric signal produced by the photo detecting means, and for converging the light beam accurately on the optical recording medium. In accordance with the present invention, the optical information recording-reproduction apparatus is characterized in that the focus error signal is compensated such that the focus servo control signal becomes respectively optimized for the groove sections and for the sections between the groove sections of an optical beam guiding track on an optical recording medium by changing the compensation amount whenever the groove sections are tracked from that used when the sections between the groove sections are tracked.

In accordance with the above arrangement, the light beam emitted from the light source is reflected on the surface of the optical recording medium, and the reflected light is detected by the photo detecting means which produces a corresponding electric signal. When the light beam is used to read or record within the groove sections of a track on the optical recording medium, the compensation amount is switched to a compensation amount which is, more suitable for the groove sections. Thereafter, in the focus servo control means, the focus error signal which is now compensated by the newly optimized compensation amount is generated corresponding to the electric signal produced by the photo detector. As a result, the light beam is accurately converged on the groove sections the optical recording medium.

In contrast, when the light beam tracks the sections between the groove sections on the optical recording medium, the compensation amount is switched to one which is more suitable for sections between the groove sections. Thereafter, similarly to that described above, the light beam is accurately converged on the sections between the groove sections in the optical recording medium.

The most suitable focus error signal for the groove sections is different from the sections between the groove sections due to the influence of crosstalk between error signals. Therefore, if focus servo control is carried out by distinct focus servo control signals, recording or reproducing can be independently effectuated at the most suitable focusing positions for both the groove sections and the sections between the groove sections of the light beam guiding track respectively. As a result, the quality of a reproduced signal is significantly improved.

In addition, whenever the optical information recording-reproduction apparatus is actuated, the value of compensation amount is arbitrarily changed. Information is test-read from the groove sections and from the sections between the groove sections, and used to set the compensation amount so that the reproduced signal is optimized. As a result, since the value of the compensation amount is renewed every time the optical information recording-reproduction apparatus is actuated, influences due to differences in characteristics of optical recording medium, aging of the optical information recording-reproduction apparatus, etc. do not exist, thereby making it possible to record or reproduce the desired information more stably.

In addition, it is a further object of the present invention to provide an optical recording medium which is suitable for the above-mentioned optical information recording-reproduction apparatus.

In accordance with this object of the present invention, one example embodiment incorporates an optical recording medium characterized in that it includes a compensation amount setting area for storing the most suitable compensation amounts for both the groove sections and the sections between the groove sections of the light beam guiding track whenever an optical information recording-reproduction apparatus is actuated while reading or recording on a part of the optical recording medium.

With the above described arrangement, a test-reading is carried out on the compensation amount setting area whenever the optical information recording-reproduction apparatus is actuated, and the most optimum compensation amounts are thereby obtained such that reproduced signals with high quality are respectively obtained on both the groove sections and the sections between the groove sections. Moreover, influence on the recording information, such as erasing of information due to misoperation at the time of test-reading, can be eliminated, thereby making it possible to improve reliability of the apparatus.

For a fuller understanding of the nature and numerous advantages of the invention, reference should be made to the ensuing detailed description taken in conjunction with the accompanying drawings.

DESCRIPTION OF THE EMBODIMENTS

The following details one example embodiment of the present invention with reference to FIGS. 1 through 6, wherein an optical information recording-reproduction apparatus in accordance with the present invention is utilized to read or record an optical disk medium that utilizes magneto-optical effects.

Figures 2A, 2B:
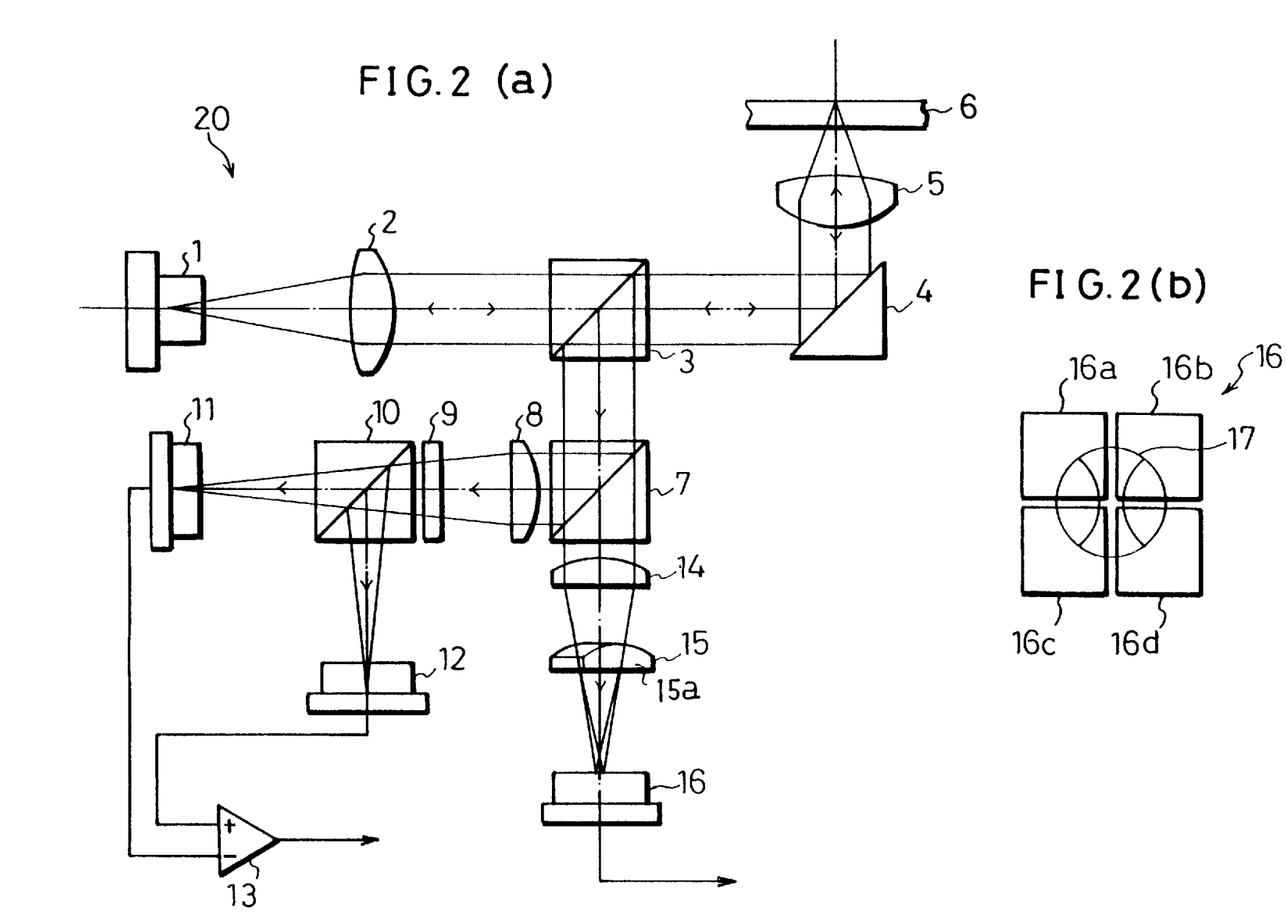
FIG. 2(a) is an arrangement drawing which shows an arrangement of an optical pickup in the optical information recording-reproducing apparatus.
FIG. 2(b) is a front view which schematically shows light receiving sections of a second photo detector in the optical pickup.

The optical information recording-reproducing apparatus is provided with an optical pickup as depicted in FIG. 2(a). Optical pickup 20 includes a semiconductor laser light source 1, first through third photo detectors 16, 11 and 12, various optical parts for irradiating a light beam to these photo detectors. Optical disk 6 is preferably of the writable magneto-optical type.

A light beam emitted from the semiconductor laser 1 is converted into a parallel light by a collimator lens 2 and is irradiated to a first beam splitter 3. The light transmitted through the first beam splitter 3 is reflected by a 45 degrees mirror 4, and is led to the optical disk 6 through an objective lens 5 so as to be converged on the optical disk 6.

Subsequently, the light converged on the optical disk 6 is reflected from the optical disk 6 and passes reversely through the above described optical path. Part of the light is transmitted through the first beam splitter 3 and returns to the semiconductor laser 1 and part of the light is reflected towards a second beam splitter 7 by the first beam splitter 3.

A part of the light reflected towards the second beam splitter 7 is reflected to a first converging lens 8 at the second beam splitter 7, and the other part of the light is transmitted through a second converging lens 14. After the light transmitted through the second converging lens 14 is transmitted through a cylindrical lens 15 (which is set such that its generating line and the plane of FIG. 2(a) make an angle of 45 degrees) and then converged onto photo detector 16 whereby it is converted into an electric signal.

In addition, the light reflected towards the first converging lens 8 in the second beam splitter 7 is converged by the first converging lens 8 and rotated 45 degrees in polarization by ½ wavelength plate 9. Thereafter, the light enters polarizing beam splitter 10 where part of the light is transmitted through so as to be converged on a second photo detector 11. The other part of the light is reflected from polarizing beam splitter 10 and is converged on a third photo detector 12.

An output of the second photo detector 11 is provided to a minus input of a differential detector 13, and an output of the third photo detector 12 is inputted to a plus input of the differential detector 13. The difference between signals inputted from respective photo detectors 11 and 12 is provided at an output of differential detector 13 and represents the detected reproduced information signal as recorded on optical disk 6.

With the above arrangement, paths of the light beam emitted from the semiconductor laser 1 may be characterized into four separate optical paths. Specifically, in a first optical path, after the light beam is transmitted through beam splitter 3 where it forms a spot on optical disk 6 by means of mirror 4 and objective lens 5, the light beam is reflected from optical disk 6 and follows the same path in reverse order so as to return back to semiconductor laser 1. In a second optical path, the light reflected from the optical disk 6 is reflected by the first beam splitter 3 and is transmitted through beam splitter 7. Thereafter, the light impinges on photo detector 16 where it is be converted into an electric signal. In a third optical path, the light reflected by second beam splitter 7 is transmitted through polarizing beam splitter 10 and impinges on photo detector 11. In a fourth optical path, light reflected by polarizing beam splitter 10 impinges on photo detector 12. The light beams which impinge on detector 11 and on photo detector 12 are converted into electric signals that are differentially detected to provide "information reproducing signals" by differential detector 13.

Figure 1:
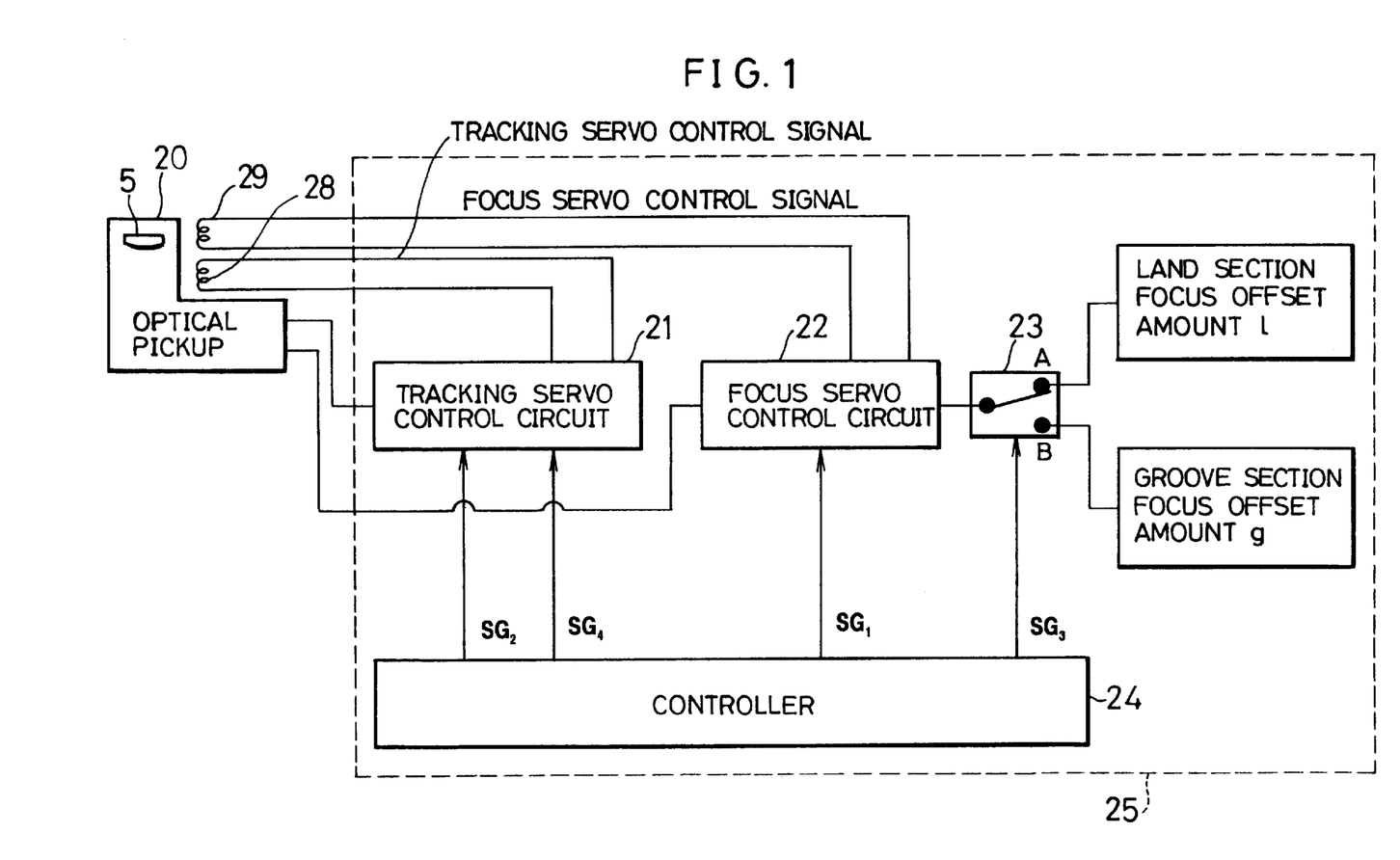
FIG. 1 is a block diagram which shows a servo control system of an optical information recording-reproduction apparatus in one embodiment of the present invention.

The following description explains the servo control system of the optical information recording-reproduction apparatus of the present embodiment with reference to FIG. 1.

As depicted the optical information-reproduction system includes optical pickup 20, a tracking actuator 28, a focus actuator 29 and a servo control system 25. The servo control system 25 is composed of a tracking servo control circuit 21, a focus servo control circuit 22, a switch 23 and a controller 24.

The output of the f first photo detector 16 in the optical pickup 20 is inputted to tracking servo control circuit 21 and focus servo control circuit 22. Moreover, tracking actuator 28 is connected to tracking servo control circuit 21, and focus actuator 29 is connected to focus servo control circuit 22. A switch 23 is also connected to focus servo control circuit 22. Switch 23 can be set to either position A or position B, namely, a "land section" focus offset amount "1" (i.e., focus error signal compensation amount for reading land sections on the disk) or a "groove section" focus offset amount "g" (focus error signal compensation amount for groove editors). Controller 24 is connected to tracking servo control circuit 21, focus servo control circuit 22 and switch 23.

With the above described arrangement, a signal obtained from the first photo detector 16 is respectively inputted to the tracking servo control circuit 21 and the focus servo control circuit 22. The tracking servo control circuit 21 is controlled by a tracking servo polarity control signal $SG_2$ and a tracking servo ON signal $SG_4$ from the controller 24. The focus servo control circuit 22 is controlled by a focus servo ON signal $SG_1$ from the controller 24. Changing the offset amount selection position of switch 23 is controlled by a switching signal $SG_3$ from the controller 24.

Figure 3:
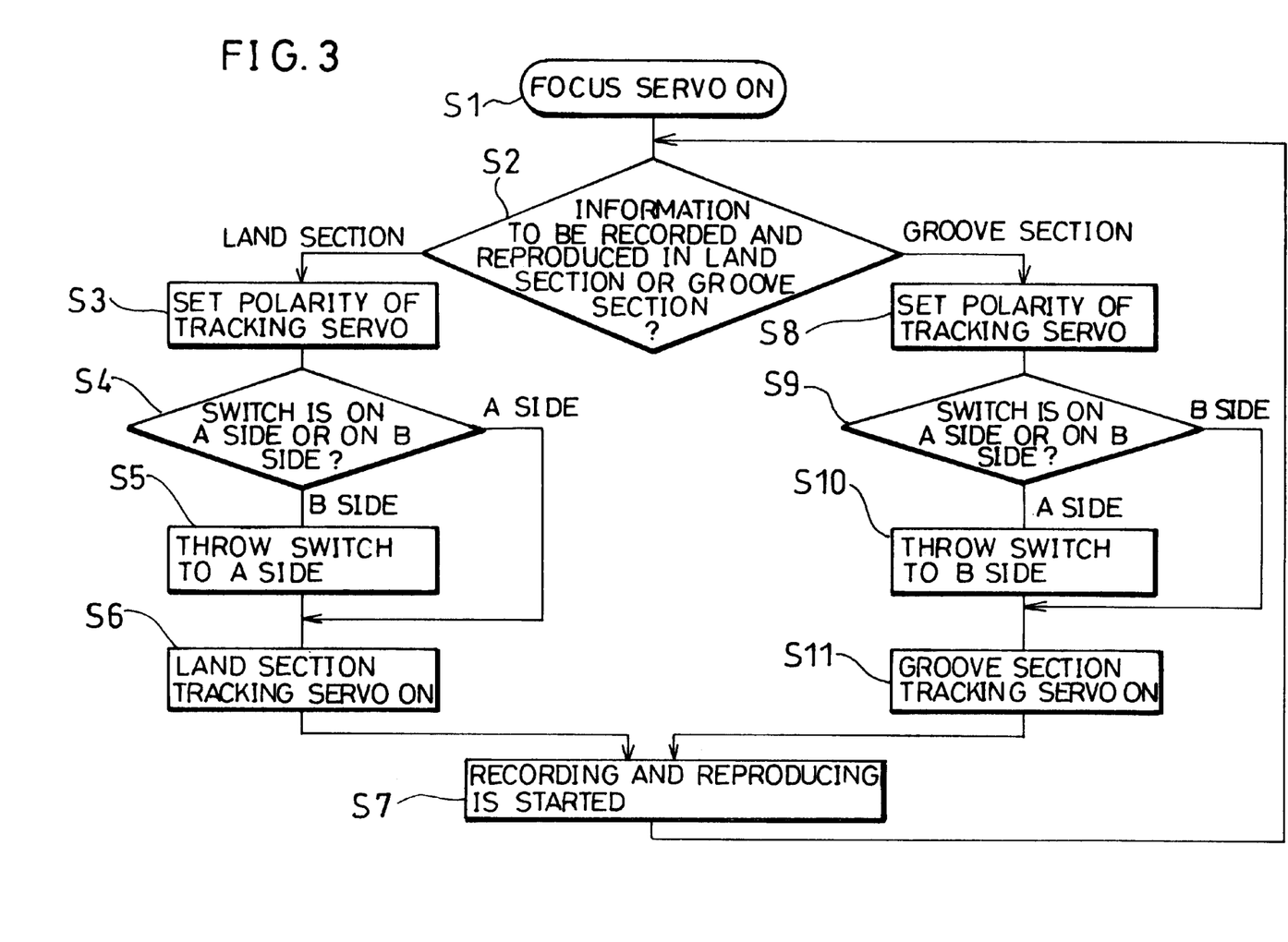
FIG. 3 is a flow chart which shows a servo control in the servo control system.

Referring now to FIG. 1 and the flow chart of FIG. 3, a method of servo control for the above described system is explained.

First, the focus servo ON signal $SG_1$ is inputted from the controller 24 to the focus servo control circuit 22. The focus servo control circuit 22 is actuated by the focus servo ON signal $SG_1$, and the focus actuator 29 is driven by a focus servo control signal according to a focus error signal $F_1$, mentioned later, so that the focus servo is turned ON (S1). At this time, the focus offset amount may be the land section focus offset amount 1 or the groove section focus offset amount g, so the switch 23 may be set to either the side A (i.e., position A) or the side B (e.e., position B).

Subsequently, a judgment is made whether the desired information to be recorded or reproduced exists on the land section or the groove section (S2).

At S2, if a judgment is made that the information exists on the land section, the tracking servo control circuit 21 is set such that the light beam tracks the land section by the tracking servo polarity control signal $S_2$ from the controller 24 (S3). Thereafter, a judgment is made as to whether the switch 23 is set to position A or position B (S4).

At S4, if a judgment is made that the switch 23 is at position A, it is not necessary to change the position of switch 23. When the tracking servo ON signal $S_4$ is inputted from the controller 24 to tracking servo control circuit 21, the tracking servo control circuit 21 is actuated, and the tracking actuator 28 is driven by the tracking servo control signal according to a tracking error signal, T, mentioned later, so that the tracking servo is turned ON (S6).

Meanwhile, at S4, if a judgment is made that the switch 23 is at position B, the switch 23 is switched to position A by switching signal $S_3$ from controller 24 so as to be set to provide the land section focus offset amount 1 (S5). Once this switching operation by the switch 23 is performed, the focus offset amount changes, so the distance between the objective lens 5 and the optical disk 6 also changes. However, since the change in focus offset amount only changes this distance by microns, the focus servo is not turned off in response to the switching operation of switch 23. Thereafter, in the manner same as described above, the tracking servo is turned ON (S6), and recording or reproducing of the information is started (S7).

In addition, at S2, if a judgment is made that the information to be recorded or reproduced exists in the groove section, the tracking servo control circuit 21 is set so as to track the groove section by the tracking servo polarity control signal $S_2$ from the controller 24 (S8). Thereafter, a judgment is made as to whether the switch 23 is set at position A or at position B (S9).

At S9, if a judgment is made that the switch 23 is set at position A, it is switched to position B by signal $S_3$ from the controller 24 so that the groove section focus offset amount, g, is selected (S10). Subsequently, in the same manner as at S6, the tracking servo is turned ON (S11). Meanwhile, at S9, if a judgment is made that the switch 23 is set to position B, it is not necessary to switch its position, so in the same manner as at S6, the tracking servo is turned ON (S11). Thereafter, the information starts to be recorded or reproduced (S7).

The following explanation describes the tracking error signal and the focus error signal that are generated by the electric signal from photo detector 16. Moreover, the following also describes in particular the focus error signal generating system included in focus servo control circuit 22.

As shown in FIG. 2(b), photo detector 16 includes four light receiving sections 16a,16b,16c and 16d. Since light received by detector 16 has been diffracted by a track on optical disk 6, a diffraction pattern 17 is formed on the four light receiving sections of photo detector 16. The diffraction pattern 17 is generated because of a positional relationship between the light beam spot and the light beam guiding track on optical disk 6.

Since a "push-pull" amplification method is used for detecting the tracking error signal in the first photo detector 16, the tracking error signal (T) generated is based upon the asymmetric properties of the diffraction pattern 17. Therefore, tracking error signal T is obtained by making a calculation according to the following equation:

$$T=(Sa+Sc)-(Sb+Sd) \qquad \text{Equ. (1)}$$

where the outputs from the light receiving sections 16a,16b, 16c and 16d are represented by Sa,Sb,Sc and Sd.

Figure 4A:
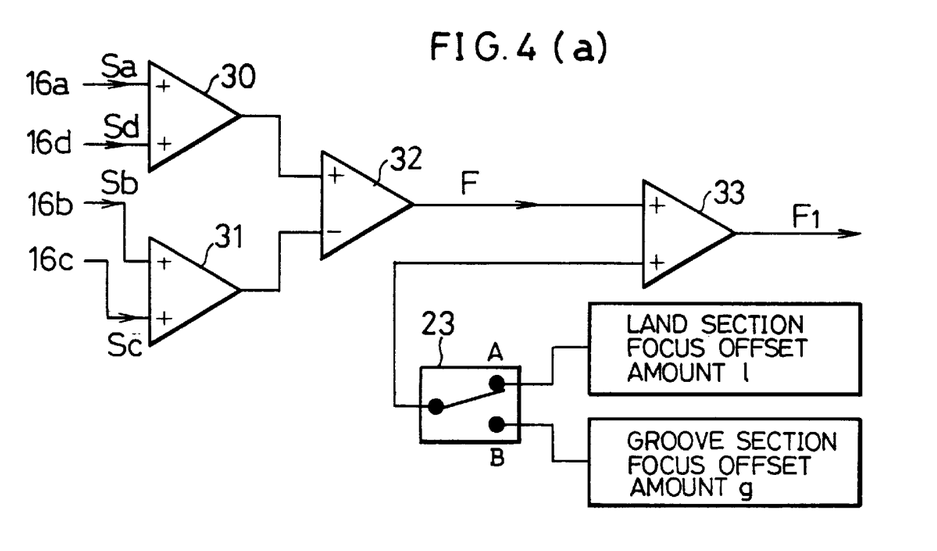
FIG. 4(a) is a circuit diagram which shows a focus error signal generating system in a focus servo control circuit.

Meanwhile, since an astigmatism method is used as a method for detecting the focus error signal, a focus error signal is generated by the focus error signal generating system shown in FIG. 4(a). The focus error signal generating system is composed of addition amplifiers 30 and 31, a differential amplifier 32 and an addition amplifier 33.

The light receiving sections 16a and 16d of photo detector 16 are connected to inputs sides of addition amplifier 30, and the light receiving sections 16b and 16c are connected to inputs of the addition amplifier 31. Outputs of addition amplifiers 30 and 31 are connected to a plus input and a minus input of differential amplifier 32 respectively. An output side of the differential amplifier 32 is connected to an input side of the addition amplifier 33, and the other input side of the addition amplifier 33 is connected to the switch 23.

With the above arrangement, the sum of the outputs of light receiving section 16a and the light receiving section 16d (Sa+Sd) is obtained from addition amplifier 30, and the sum of the outputs of light receiving section 16d and light receiving section 16c (Sb+Sc) is obtained from addition amplifier 31. Thereafter, the difference between the outputs of addition amplifiers 30 and 31 is calculated by differential amplifier 32 and provides the focus error signal represented by the following equation:

$$F=(Sa+Sd)-(Sb+Sc) \qquad \text{Equ. (2)}$$

At this point the focus error signal F is uncompensated and is same as a conventional focus error signal.

Referring now to FIG. 4(a), a focus offset amount, "X" for reading either land sections or groove sections is determined by the position of switch 23 and added to the focus error signal F by addition amplifier 33 to provide a focus error signal F, as represented by the following equation:.

$$F_1=(Sa+Sd)-(Sb+Sc)+X \qquad \text{Equ. (3)}$$

Accordingly, a focus servo is controlled by changing the position of switch 23 in response to the focus servo control signal based upon the focus error signal $F_1$ with focus offset amounts suitable for tracking either the land section or for tracking the groove sections of the optical disc medium. Focus offset amount X is the land section focus offset amount "1" (minus sign) when land sections are tracked and is the groove section focus offset amount "g" (plus sign) when groove sections are tracked.

As mentioned above, since in the optical information recording-reproduction apparatus of the present embodiment, tracking of land sections and groove section is carried out by using different focus servo control signals, information can be recorded or reproduced at the most suitable focusing positions for both the land sections and the groove sections of an optical medium. When the focus offset amount is used as a compensation amount, it is possible to provide a simple circuit. In the present invention, besides the above-mentioned servo control, additional controls are provided for the optical information recording-reproduction apparatus.

In the present embodiment, in order to obtain an optimized focus servo control signal, the focus error signal is compensated according to the focus offset amount, but the most suitable focus servo control signal can be obtained also by compensating the focus error signal according to the other compensation amounts. One example of other compensation amounts is an electrical amplification factor ratio or "gain balance" of the outputs from each light receiving section of the photo detector for generation of the servo error signal. Even when the method of controlling the gain balance is used, a signal equivalent to the focus error signal, $F_1$, which is compensated according to the focus offset amount can be obtained. This is explained with reference to FIG. 4(b), below.

Figure 4B:
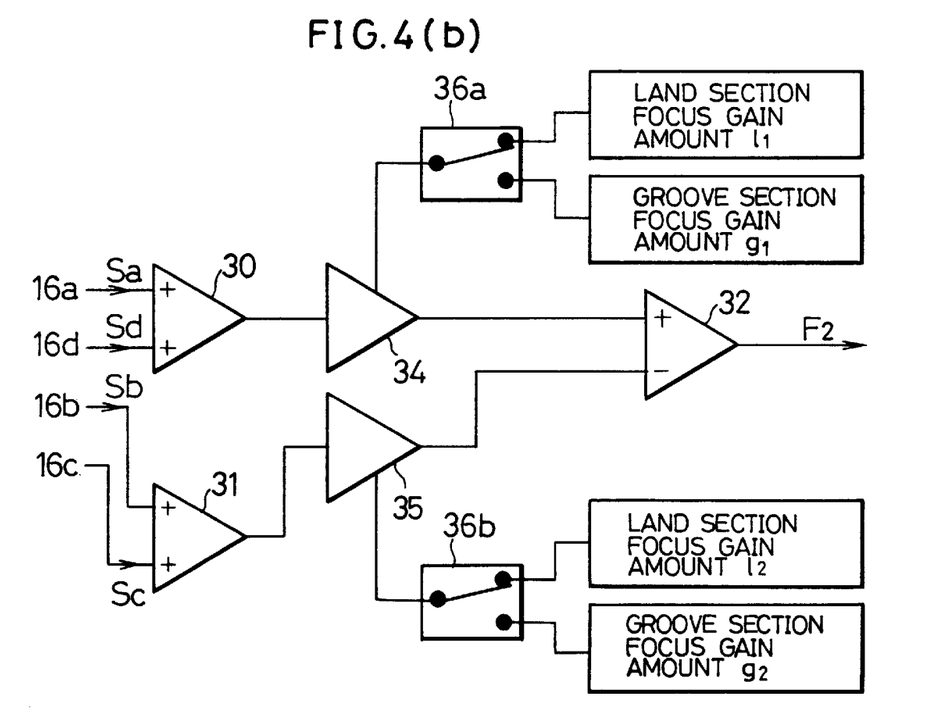
FIG. 4(b) is a circuit diagram which shows another arranging example of the focus error signal generating system.
Figure 5:
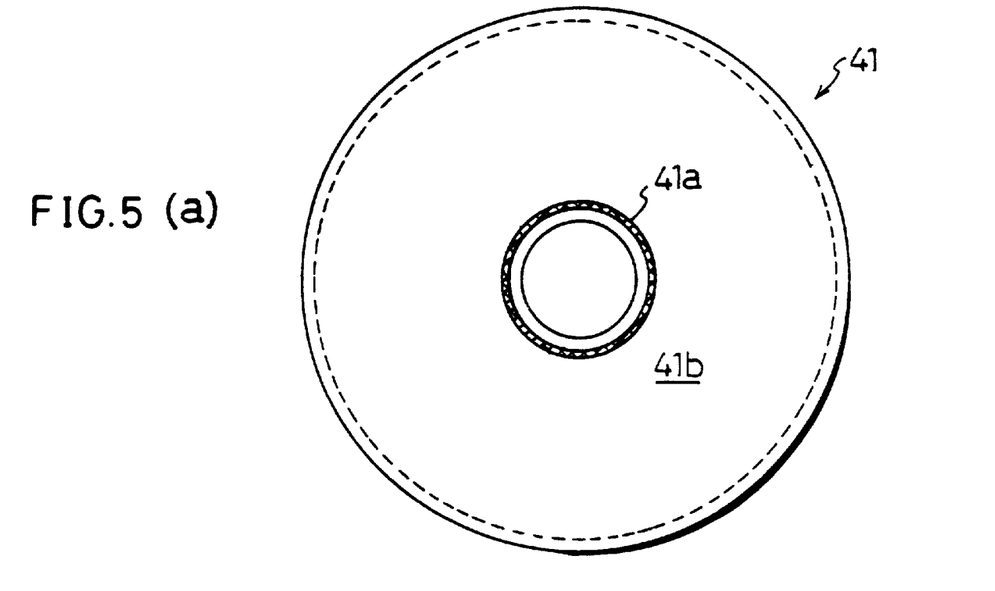
FIG. 5(a) is a front view which shows an optical disk in the case where a spindle motor rotates in a constant direction.
FIG. 5(b) is a front view which shows an optical disk in the case where the spindle motor rotates in the reverse direction.

The focus error signal generating system in this case is composed of the addition amplifiers 30 and 31, amplifiers 34 and 35 and the differential amplifier 32. The amplification factor of the amplifier 34 is $F_{G1}$ and the amplification factor of the amplifier 35 is $F_{G2}$. Two switches 36a and 36b are provided instead of switch 23. The amplifier 34 is positioned between the output side of the addition amplifier 30 and the plus input side of the differential amplifier 32, and the amplifier 35 is positioned between the output side of the addition amplifier 31 and the minus input side of the differential amplifier 32. The switches 36a and 36b are controlled by the controller 24. When the switches are set to the land section or to the groove section, the focus gain amount is set according to each case.

With the above described arrangement, the sum of the outputs from the light receiving sections 16a and 16d of the first photo detector 16 (Sa+Sd) is obtained by the addition amplifier 30, and the sum of the outputs of the light receiving sections 16b and 16c (Sb+Sc) is obtained by addition amplifier 31. The signals generated by addition amplifiers 30 and 31 are amplified by the amplifiers 34 and 35, respectively.

At this time, a focus gain amount $l_1$ or $g_1$ is selected by the switch 36a and is inputted to the amplifier 34 so that the signal is amplified by a factor $F_{G1}$. A focus gain amount $l_2$ or $g_2$ is selected by the switch 36b and is inputted to the amplifier 35 so that the signal is amplified by a factor $F_{G2}$. The focus gain amounts used are land section focus gain amounts $l_1$ and $l_2$ when tracking land sections and are groove section focus gain amounts $g_1$ and $g_2$ when tracking groove sections. Thereafter, the difference of outputs from the amplifiers 34 and 35 is calculated by the differential amplifier 32, and the focus error signal $F_2$ is obtained according to the following equation:

$$F_2 = F_{G1}(Sa+Sd) - F_{G2}(Sb+Sc) \quad \text{Equ. (4)}$$

Equation (4) can be rewritten as:

$$F_2 = (Sa+Sd) - (Sb+Sc) + \alpha \quad \text{Equ. (5)}$$

where, $\alpha = (F_{G1}-1) \times (Sa+Sd) - (F_{G2}-1) \times (Sb+Sc)$.

When a value represented by α of the equation (5) is set so as to be a same value as the focus offset amount X, the focus error signals $F_1$ and $F_2$ are equivalent to each other. Therefore, in order to obtain the optimum focus servo control signal, in a manner similar to compensation of the focus error signal according to the focus offset amount, the focus servo control can also be made by compensating the focus error signal according to the focus gain amount, namely, the gain balance.

In accordance with the present invention as depicted here, in FIG. 4(b), the gains of both amplifiers 34 and 35 are changed, but the same effect can be obtained by changing one of the gains at the time of tracking the land section or at the time of tracking the groove section.

The following will describes two example methods for setting the compensation amount (i.e., the focus offset amount and the focus gain amount) applicable for tracking the land section and for tracking the groove section as "setting example 1" and "setting example 2" respectively:

Setting example (1) is a method for setting the compensation amount based upon crosstalk between error signals at the time of optical pickup assembly. As mentioned above, the difference in the optimum focusing positions for reading/recording on the land section verses the groove section of optical disk media is created primarily by crosstalk between the T and F error signals of the optical pickup. For this reason, a "reference disk is created and the crosstalk between error signals can be corrected with the compensation amount and recorded to control the servo control system.

For example, FIG. 6 shows waveforms of the tracking error signal T and the focus error signal F obtained when only the focus servo is turned ON. Here, the focus offset amount at the time of tracking the land section 6b is "1" and the focus offset amount at the time of tracking the groove section 6a is "g". According to the equation (3), for the case where a focus offset amount is used as the compensation amount, the focus servo control (in the state where the tracking servo is turned ON) can be made based upon the most suitable focus offset amount (i.e., on GND of FIG. 6) for both the land section 6b and the groove section 6a. As a result, information can be recorded or reproduced from on optimized focusing position whenever the land section 6b or the groove section 6a of the optical disk 6 are respectively tracked.

Setting example (2) is a method for setting the compensation amount based upon a prerecorded signal read (reproduced) at the time of starting up the optical information recording-reproduction apparatus.

Prior to optically recording or reproducing information after the optical information recording-reproduction apparatus is started up, the compensation amount is arbitrary and the optical disk signal must be test-read so that the proper compensation amount that ensures the maximum reproduced signal can be obtained for both the land and the groove sections respectively. Preferably, this operation is performed every time the optical information recording-reproduction apparatus is actuated, and the obtained compensation amounts are stored for use by the servo control system as the land section compensation amount and the groove section compensation amount.

Compared to method 1, method 2 will always ensure the most suitable focus servo control. One reason, for example, is that in using method 1, if the amount of the crosstalk between the error signals changes due to aging of the optical pickup, the previously set suitable compensation amount may be deviated, but in the method 2, the compensation amounts for the land groove sections are renewed and reset every time the apparatus is actuated.

The following briefly explains why method (2) for obtaining the most suitable compensation amount, is more effective:

In accordance with the present invention, a preferred optical disk is provided with a "compensation amount setting area" besides the conventional recording/ reproducing area where information is recorded or reproduced. A reference signal for setting the compensation amount has been previously recorded to this area, and compensation amounts for the land section and the groove section, which are stored in a memory associated with the servo control system, are set based upon the reproduced reference signal. When a compensation amount is set in this manner, problems, such as accidental erasing of recorded information due to misoperation while test-reading can be eliminated, thereby making it possible to improve the reliability of the apparatus.

A preferred reference signal, for example, is one having the shortest feasible bit length and which is recorded to both the land and the groove sections of the optical disk. The prerecorded compensation amount stored in the compensation amount setting area is arbitrarily changed and its reference signal is read and reproduced. Next, the compensation amount is then reset so that the amplitude of the reproduced reference signal is maximized.

In addition, as shown in FIGS. 5(a) and 5(b), for example, when a compensation amount setting area is provided at an internal circumference, (i.e., an inner toroidal region) or an outer circumference (i.e., an outer toroidal region) of the optical disk, an optical disk that is more suitable for the optical information recording-reproduction apparatus of the present embodiment is realized.

One reason for this is that an optical disk which records or reproduces information to or from both the land and the groove sections of an optical disk can utilize two methods for recording or reproducing information. In one method, a spindle motor for rotating the optical disk rotates the disk in the direction while recording or reproducing to/from both the land and the groove sections, from the internal circumference (i.e., the center) to the outer circumference of the optical disk. In the other method, the rotational direction of the disk is reversed between recording to or reproducing from the land section and recording to or reproducing from the groove section. In addition, the recording or reproducing is carried out from the internal circumference to the outer circumference for the land section, and from the outer circumference to the internal circumference for the groove section.

Therefore, as shown in FIG. 5(a), for the case where the rotating direction of disk 41 is kept constant, a recording/reproducing area 41b is provided with a compensation amount setting area 41a at an inner toroidal region for both the land and the groove sections.

Using the above arrangement, test-reading is carried out in the compensation amount setting area 41a whenever the optical information recording-reproduction apparatus is actuated. The compensation amounts that ensure the maximum reproducing signal are respectively obtained for both the land section and the groove section. Since compensation amount setting area 41a is provided near the internal circumference of the optical disk 41, the compensation amount can be set before any information is recorded or reproduced.

Alternatively, for the other method wherein an optical disk is rotated in one direction as recording or reproducing on the land section is carried out from the internal circumference to the outer circumference, and the rotational direction of the disk is then reversed so that recording or reproducing is carried out from the outer circumference to the internal circumference on the groove section, as shown in FIG. 5(b), optical disk 45 is provided with a recording/reproducing area 45b, a land section compensation amount setting area 45a at an inner toroidal region near the internal circumference and a groove section compensation amount setting area 45c at an outer toroidal region near the outer circumference of the optical disk 45.

Using the above arrangement of FIG. 5(b), when test-reading is carried out, in the land section compensation amount setting area 45a and in the groove section compensation amount setting area 45c, a compensation amount which ensures the maximum reproduction signal is respectively obtained for the land section and the groove section. Since land section compensation amount setting area 45a is provided near the internal circumference of optical disk 45 and the groove section compensation amount setting area 45c near the outer circumference, the compensation amount can be easily set for the land section and the groove section each, respectively, before information is recorded or reproduced.

Likewise, in the case describe immediately above, if the recording or reproducing of information is carried out from the outer circumference to the internal circumference on the land section and from the internal circumference to the outer circumference on the groove section, then the groove section compensation amount setting area is preferably positioned near the internal circumference of the optical disk and the land section compensation amount setting area near the outer circumference.

As previously discussed above, first photo detector 16 of an example embodiment according to the present invention adopts a "push-pull" method for tracking-error signal detection and an "astigmatism" method for focus-error signal detection, but the present invention is not intended to be limited solely to these two particular approaches. For example, other servo signal detecting arrangements might include a "three-beam method" for tracking-error signal detection and a "knife edge method" focus error signal detection. Where these methods are used, just as in the preceding cases where groove and the land sections are respectively tracked, the focus servo control is optimized to obtain the most suitable focus position.

In a preferred embodiment of the present invention, the optical disk is an optical recording medium that utilizes a known magneto-optical effect. However, it is contemplated that optical disks that utilize other known signal reproducing principles, such as "phase-change" effects, can also be used in accordance with the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an optical information recording-reproduction apparatus that utilizes a light beam for recording and reproducing information on or from both land sections and groove sections of an optical recording medium, said information recording-reproduction apparatus having a light source and an optical pick-up device sensitive to light from said light source, and further including circuitry for generating a focus error signal, a method for determining and setting distinct respective compensation amounts to said focus error signal, based upon signal crosstalk between tracking error and focus error signals of an optical pickup device at a time of optical pickup assembly, which are specific to a particular optical pickup for tracking groove sections of an optical beam guiding track of said optical recording medium and for tracking land sections between groove sections, comprising the steps of:

(a) obtaining said compensation amounts, each respectively for the groove sections and the land sections between the groove sections of an optical beam guiding track of an optical recording medium, based on an optical pickup output signal obtained while reproducing information stored on a reference optical recording medium as measured when said particular optical pickup is assembled, wherein said focus error signal compensation amounts are particular to said optical pickup device and wherein each of the respective compensation amounts is a focus offset amount proportional to a deviation in an optical axis direction of reflected light from a desired optimal focusing position in said land and groove sections;

(b) storing the respective compensation amounts obtained in step (a) in a memory device accessible by a servo control system used to control optical beam focusing; and (c) retrieving from memory and applying said respective compensation amounts to a focus error signal when recording or reproducing information to/from an optical recording medium.

2. An optical information recording/reproduction apparatus which records or reproduces information to or from groove sections and land sections occurring between the groove sections of an optical recording medium, comprising:

a light source for emitting a focused light beam;

photodetecting means for producing electric signals responsive to detected light obtained by reflecting the focused light from a surface of said optical recording medium, wherein said photodetecting means includes a plurality of light receiving sections;

focus servo control means for generating a focus error signal which determines a focus servo control signal according to said electric signals and for converging the light beam accurately on said optical recording medium, wherein said focus servo control means comprises:

a pair of compensation amplifiers each having again control input and each connected to receive a summed light value signal comprising signals from a plurality of different light receiving sections of said photodetecting means;

means for selectively providing either a land section focus gain signal of a predetermined value or a groove section focus gain signal of a predetermined value to the gain control input of each signal compensation amplifier of said pair, said focus gain signals determining an amount of amplification provided by each compensation amplifier; and a differential amplifier having inputs connected to outputs of said compensation amplifiers and an output providing said focus error signal, wherein each of two summed light value signals are individually amplified in accordance with a specific gain compensation amount corresponding to a land section gain amount or a groove section gain amount before being provided to the differential amplifier such that the focus error signal produced by the differential amplifier is compensated in such a manner that the focus servo control signal becomes optimized, respectively, for either the groove sections or the sections between the groove sections of the optical recording medium by changing said gain compensation amount depending on whether the groove sections are tracked or whether the sections between the groove sections are tracked.

3. In an optical information recording/reproduction apparatus that utilizes a light beam for recording and reproducing information on or from both land sections and groove sections of an optical recording medium, said information recording-reproduction apparatus having a light source and an optical pick-up device sensitive to light from said light source, and further including circuitry for generating a focus error signal, wherein said circuitry comprises a pair of compensation amplifiers each having a gain control input and each connected to receive a summed light value signal comprising signals from a plurality of different light receiving sections of a reflected light detector, a means for selectively providing either a land section focus gain signal of a predetermined value or a groove section focus gain signal of a predetermined value to the gain control input of each signal compensation amplifier of said pair, said focus gain signals determining an amount of amplification provided by each compensation amplifier, and a differential amplifier having inputs connected to outputs of said compensation amplifiers and an output providing said focus error signal, wherein each of two summed light value signals are individually amplified in accordance with a specific gain compensation amount corresponding to a land section gain amount or a groove section gain amount before being provided to the differential amplifier, a method for determining and setting distinct respective compensation amounts to said focus error signal for tracking groove sections of a light-beam guiding track of said optical recording medium and for tracking land sections between groove sections, comprising the steps of:

(a) obtaining said compensation amounts, each respectively for the groove sections and the land sections between the groove sections of an optical beam guiding track of an optical recording medium, based on a reference optical recording medium as measured when said optical pickup is assembled, wherein each of the respective compensation amounts constitutes a value equal to a mathematical difference between said individually amplified summed light value signals from said reflected light detector, and wherein said focus error signal compensation amounts are particular to said optical pickup device;

(b) storing the respective compensation amounts obtained in step (a) in a memory device accessible by a servo control system used to control optical beam focusing; and (c) retrieving from memory and applying said respective compensation amounts to a focus error signal when recording or reproducing information to/from an optical recording medium.

4. In an optical information recording/reproduction apparatus having circuitry for generating a focus error signal, wherein said circuitry comprises a pair of compensation amplifiers each having a gain control input and each connected to receive a summed light value signal comprising signals from a plurality of different light receiving sections of a reflected light detector, means for selectively providing either a land section focus gain signal of a predetermined value or a groove section focus gain signal of a predetermined value to the gain control input of each signal compensation amplifier of said pair, said focus gain signals determining an amount of amplification provided by each compensation amplifier, and a differential amplifier having inputs connected to outputs of said compensation amplifiers and an output providing said focus error signal, wherein each of two summed light value signals are individually amplified in accordance with a specific gain compensation amount corresponding to a land section gain amount or a groove section gain amount before being provided to the differential amplifier, a method for determining and setting distinct respective compensation values for focus error signals while tracking groove sections of a light beam guiding track of an optical recording medium and while tracking land sections between said groove sections, comprising the steps of:

(a) initially test-reading respective signals obtained from groove sections and from sections between said groove sections of the light beam guiding track of an optical recording medium every time said recording-reproduction apparatus is actuated;

(b) obtaining respective compensation values for which reproduced signals obtained from groove sections and sections between said groove sections of said light beam guiding track become a maximum, wherein each of said respective compensation values constitutes a value equal to a mathematical difference between said individually amplified summed light value signals from said reflected light detector; and     (c) storing said respective compensation values in a memory device accessible by a servo control system for controlling optical beam focusing.

\* \* \* \* \*